United States Patent [19]

Chang et al.

[11] Patent Number: 4,580,460

[45] Date of Patent: Apr. 8, 1986

[54] BEVEL GEAR BACKLASH ADJUSTING MECHANISM

[75] Inventors: Bao-Hung Chang, Easley; Randy G. Koon, Pickens, both of S.C.

[73] Assignee: The Singer Company, Stamford, Conn.

[21] Appl. No.: 635,766

[22] Filed: Jul. 30, 1984

[51] Int. Cl.$^4$ .............. F16H 55/18; F16H 35/06; F16H 35/08; F16H 57/00

[52] U.S. Cl. ........................... 74/409; 74/395; 74/396; 74/406; 74/417

[58] Field of Search ............... 74/409, 440, 395, 396, 74/406, 416, 417, 400

[56] References Cited

U.S. PATENT DOCUMENTS

| | | | |
|---|---|---|---|
| 2,289,241 | 7/1942 | Bullock | 74/395 |
| 2,996,929 | 8/1961 | Lazarowicz | 74/409 |
| 3,667,310 | 6/1972 | Hahner | 74/417 |
| 3,817,115 | 6/1974 | Schnizler et al. | 74/417 |
| 3,896,888 | 7/1975 | Badcock | 74/406 |
| 3,901,098 | 8/1975 | Jinkins | 74/417 |
| 3,977,268 | 8/1976 | Seabrook | 74/396 |
| 4,311,063 | 1/1982 | Sistare | 74/395 |
| 4,402,677 | 9/1983 | Radocaj | 474/138 |
| 4,446,751 | 5/1984 | Andreasen | 74/396 |
| 4,474,077 | 10/1984 | Debelius | 74/417 |

FOREIGN PATENT DOCUMENTS 20561 2/1983 Japan ...................... 74/396

Primary Examiner—Lawrence J. Staab
Assistant Examiner—Michael D. Bednarek
Attorney, Agent, or Firm—Edward P. Schmidt; Robert E. Smith; Edward L. Bell

[57] ABSTRACT

A bevel gear backlash adjusting mechanism is disclosed in which a bevel gear is carried by a bearing and is rotatably carried by a stationary shaft so as to be axially shiftable therewith. The stationary shaft includes a supporting portion carried by the frame of a power tool, the supporting portion having a section slotted at an angle to the axis of the shaft. An adjustable slide is also supported by the frame and extends into the angled slotted section of the stationary shaft with an edge thereof formed as a ramp at an angle corresponding to the angle of the slotted section and in engagement therewith. Motion of the adjustable slide normal to the shaft will influence axial motion of the stationary shaft and the bevel gear carried thereon so as to allow an adjustment of the mesh between the bevel gear and its associated bevel gear.

2 Claims, 3 Drawing Figures

BEVEL GEAR BACKLASH ADJUSTING MECHANISM

BACKGROUND OF THE INVENTION

This invention is concerned with a backlash adjusting mechanism particularly for a bevel gear pair.

In many constructions of right angle sander/polishers, grinders and reciprocating saws, a bevel pair is utilized to convert the motion from the axis of rotation of the electric motor to an axis at a right angle for a sander/polisher and grinder, or for the scotch yoke mechanism of a reciprocating saw. In these applications utilizing such a bevel pair, the backlash therebetween must be carefully set so as to obtain the greatest strength and long life thereof.

There are many examples in the prior art of adjustments which may be made between bevel gears to obtain the proper backlash for optimum strength and life. In many of these prior art disclosures, considerable expense may be involved in the manufacture of parts necessary to achieve this backlash adjustment capability, or in the degree of care required in order to obtain the proper backlash. For example, the U.S. Pat. No. 2,996,929, discloses an arrangement utilizing a pair of mounting blocks, each supporting a bevel gear and shaft, which mounting blocks are slidably connected on one edge and connected by a lead screw on the other edge to vary the separation thereof for adjusting the backlash of the bevel gears. The U.S. Pat. No. 3,901,098 discloses an arrangement utilizing shims to provide for backlash adjustment, which requires an inventory of shims and a trail and error adjustment in order to achieve the proper backlash. The U.S. Pat. No. 4,311,063, discloses a sander/polisher having a combined sleeve and thrust bearing with an annular ramp that may engage a ramp surface on a bearing clamp. The combined sleeve and thrust bearing may be rotated so as to elevate a bevel gear, one of a bevel pair, into a proper backlash condition with a second of a bevel pair.

It will be recognized that implementation of the above noted bevel gear mesh adjusting mechanism would be expensive, either in terms of the components required or of the time consumed in obtaining a satisfactory mesh. What is required, is an arrangement in which the necessry gear mesh may be obtained in the environment of an assembly line, both expeditiously and accurately. Ideally, such an arrangement should be implemented as economically as possible.

SUMMARY OF THE INVENTION

This improvement is made in the environment of a reciprocating saw in which the output of an electric motor drives a bevel gear pair to influence a reciprocating motion of a saw through a scotch yoke mechanism. The driven bevel gear is supported upon a stationary stub shaft having a slot through the bottom portion thereof disposed at an angle to the axis of the shaft. An adjustable slide is seated in this angled slot so as to be selectively shiftable in a direction transverse to the axis of the stub shaft. An adjusted position of the adjusting slide may be clamped by means of a clamping screw extending through a slot in the adjusting slide and into the supporting frame for the reciprocating saw. The stub shaft is formed with a flange against which is seated a ball bearing that is pressed on the stub shaft and is accommodated in a bore in the driven bevel gear. The ball bearing is retained in the bevel gear by a retaining ring, and the driven bevel gear thus revolves about the stub shaft and is shiftable axially with it. The upper face of the driven bevel gear accommodates a pin and roller which extends into a channel of a cross bar attached to a saw for the reciprocating saw. Thus, rotary motion of the driven bevel gear influences reciprocating motion of the saw bar and saw attached to the end thereof. A proper mesh between the driven bevel gear and the bevel gear of the combination bevel gear and gear is obtained by loosening the clamping screw and applying a small force to the adjusting slide to move it in a direction transverse to the axis of the stub shaft while the motor for the reciprocating saw is operating. A suitable mesh is attained after only a few revolutions of the driven bevel gear and the clamping screw may be seated firmly to retain the position of the adjusting slide, and thus of the driven bevel gear.

DESCRIPTION OF THE DRAWINGS

While the specification concludes with claims particularly pointing out and distinctly claiming the subject matter which is regarded as forming the present invention, it is believed the invention will be better understood from the following detailed description when taken in conjunction with the annexed drawings wherein the reference characters are used for similar parts throughout the various views and which discloses, illustrates and shows a preferred embodiment or modification of the present invention and what is presently considered and believed to be the best mode of practicing the principals thereof and wherein:

DETAILED DESCRIPTION OF THE INVENTION

Figure 1:
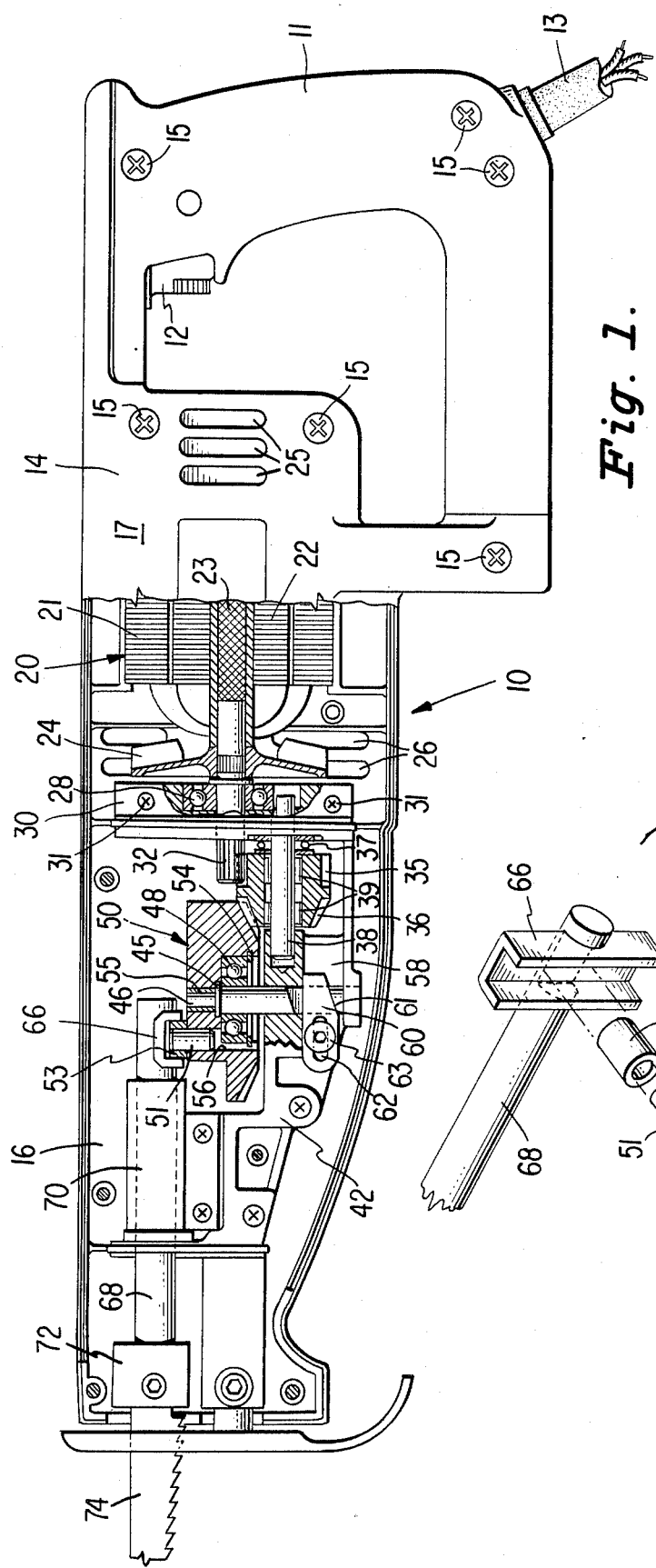
FIG. 1 is a side elevational view of a right angle reciprocating saw, with the housing partially broken away and with the gear train shown in section, illustrating the improved bevel gear backlash mechanism of the present invention.
Figure 2:
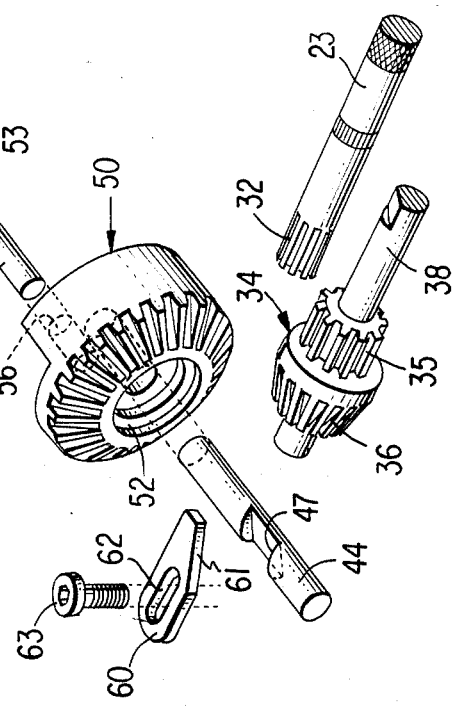
FIG. 2 is an exploded view of the parts of the bevel adjusting mechanism shown in FIG. 1; and, FIG. 3 is an enlarged view of the backlash adjusting mechanism shown in FIG. 1 with the parts thereof shown in one extreme position in phantom and an adjusted position in solid.

Referring now to FIG. 1 there is shown a reciprocating saw 10 including handle 11 on one end, which handle supports a trigger switch 12 for actuation of the saw, and from which extends a power cord 13 only a portion of which is shown. The reciprocating saw 10 is fashioned with a housing 14 of clam shell construction, including support half 16 and cover half 17, with both halves of the clam shell retained in an assembled state by screws 15, some of which are visible in the right hand side of FIG. 1. In the left hand portion of the reciprocating saw 10 a portion of the cover half 17 is broken away to expose the interior of the reciprocating saw for a greater understanding of the interior details thereof. Thus, the support half 16 of the housing 14 supports internally thereof, a motor 20 comprised of a stator 21 and a rotor 22. The rotor 22 includes a rotor shaft 23 supporting thereon a cooling fan 24 for the motor 20 which draws cooling air through the intake vents 25 of the housing 14, and expells the spent air through the exhaust vents 26 therein. The forward end of the rotor shaft 23 is supported in a ball bearing 28 which is retained affixed to the housing 14 by bearing block 30 itself affixed to the housing by screws 31. The rotor shaft 23 terminates on the opposite side of the bearing block 30 in a pinion 32. Adjacent the pinion 32 a combined bevel and spur gear 34 is supported on needle bearings 39 carried by a stationary idler shaft 38. The stationary idler shaft 38 finds support also from the bearing block 30 as well as from support 42 carried forwardly of the bearing block in the housing 14. The pinion 32 is in mesh with spur gear portion 35 of the combined bevel and spur gears 34 to thus rotate the bevel gear portion 36 thereof. A thrust bearing 37 may be positioned between the combined bevel and spur gears 34 and bearing block 30 to take the thrust load on the gears.

Situated forwardly of the idler shaft 38 in the support 42 is a stationary stub shaft 14. The stub shaft 44 is formed with a flange 45. A ball bearing 48 is press fitted onto this stationary stub shaft 44 with the inner race thereof abutting the flange 45. Above the flange 45, the stub shaft 44 is formed with a reduced diameter portion 46.

A first or driven bevel gear 50 is formed with a centrally disposed circular cavity 52 to accommodate the ball bearing 48, the circular cavity having a groove therein to receive a retaining ring 54 engaging the outer race of the ball bearing 48. Thus, the ball bearing 48, which is pressed upon the stub shaft 44 to the flange 45, rotatably retains the stub shaft axially affixed to the driven bevel gear 50. An orifice 53 extending through the driven bevel gear from the circular cavity 52 accommodates the reduced diameter portion 46 of the stationary stub shaft 44, a bearing 55 being provided for additional support for the driven bevel gear while allowing the gear to rotate on the stub shaft 44.

The lower portion of the stationary stub shaft 44 is formed with an angle slot 47 extending at an angle to the axis of the stub shaft and approximately diametrically thereof. A portion of the support 42 is slabbed as at 58 to accommodate an adjustable slide 60 having a lower edge thereof formed as a ramp 61 extending at an angle to correspond to the angle slot 47 in the stub shaft 44. The adjustable slide 60 further includes a slot 62 extending lengthwise thereof and transverse to the axis of the stub shaft 44, which slot accommodates a clamping screw 63 threaded into the slab 58 of the housing 14 so that the head of the screw may bear against the adjusting slide 60 to retain it in a selected position.

The driven bevel gear 50 further includes a pin 51 extending from the upper surface from an aperture 56 thereof and carrying a bushing 53 thereon. The pin 51 and bushing 53 extends internally of the channel like portion of cross bar 66 attached to the end of a saw bar 68. The saw bar 68 is carried in a bearing 70 and has attached to the end thereof a blade clamp 72, a saw blade 74. Operation of the motor 20 revolves the pinion 32 and drives the driven bevel gear 50 by way of the combined bevel and spur gears 34. Rotation of the driven bevel gear 50 causes the pin 51 and bushing 53 carried thereon to extend from one end to the other of the cross bar 66 attached to the saw bar 68 and cause the saw bar 68 to reciprocate within the bearing 70 thereby reciprocating the saw blade 74.

Figure 3:
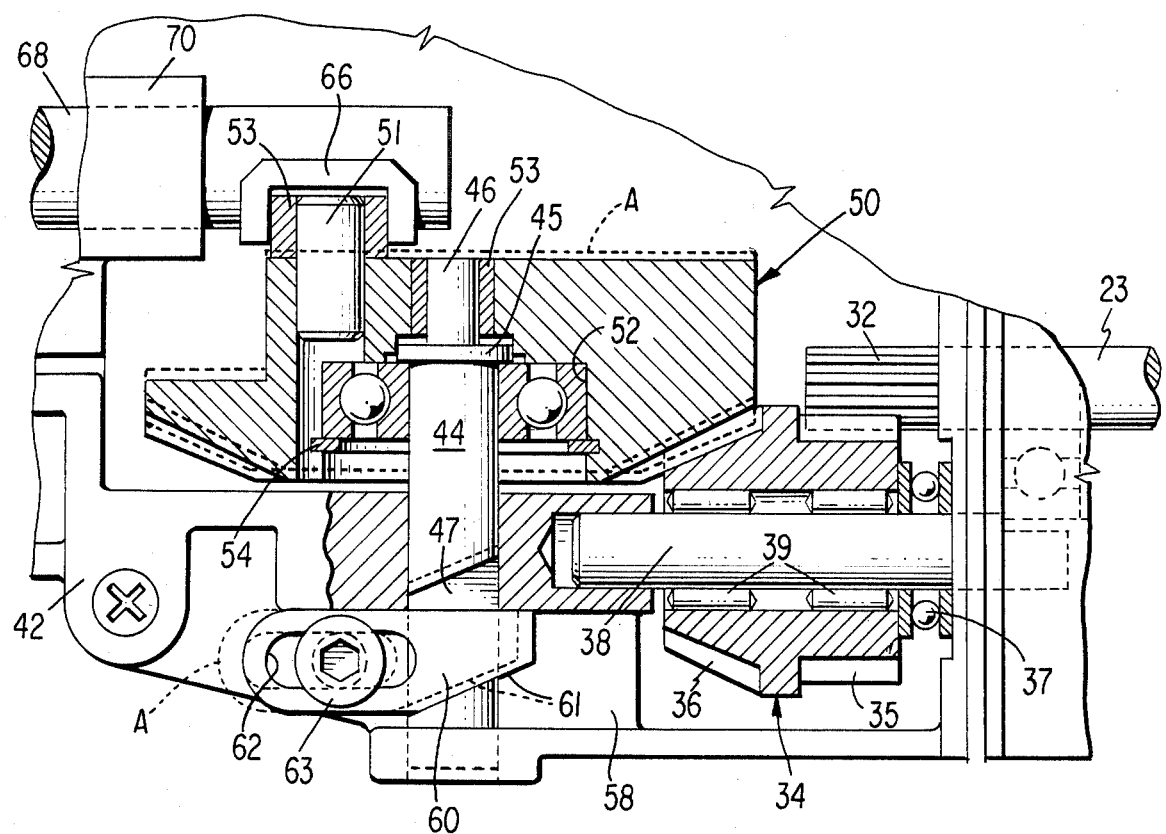

Referring to FIG. 3, the manner of adjustment of the bevel gear mesh may be described. The dotted lines A may indicate the position of the components prior to the mesh adjustment. The reciprocating saw 10 may be operated at a low speed by manipulation of the trigger 12 prior to joining of both parts of the housing 14 together and after all the components including the motor 20 and, the support 42 are joined to the support half 16 of the housing 14. The clamping screw 63 for the adjustable slide 60 would be in a loosened position. The adjustable slide 60 may be shifted to the position shown in solid as the motor 20 is revolved. When a proper mesh has been achieved as determined during operation of the reciprocating saw by an absence of binding of the gears and otherwise smooth operation thereof, the clamping screw 63 may be bottomed against the adjustable slide 60 to retain the same in the adjusted position. Thereafter, the cover half 17 of the housing 14 may be attached to the support half thereof by screws 15.

It will be understood that various changes in the details, materials, arrangement of parts and operating conditions which have been herein described and illustrated in order to explain the nature of the invention, may be made by those skilled in the art within the principles and scope of the invention.

We claim:

1. In an electrically driven power tool having a frame supporting a right angle drive, the right angle drive comprising:

a first bevel gear in mesh with and driven by an associated bevel gear; a shaft supporting said first bevel gear, means on said frame supporting said shaft on an axis fixed with respect to said frame and with capacity for axial movement with respect to said frame, said shaft including a section slotted at an acute angle to the axis of said shaft; rotatable bearing means carried by said shaft and interconnecting said shaft and said first bevel gear for combined axial movement; an adjustable slide supported by said frame for slidable motion in a direction normal to said shaft to inhibit rotation of said shaft, said adjustable slide extending into said angled slotted section of said shaft, said adjustable slide including an edge formed as a ramp at an angle corresponding to the angle of said slotted section and in engagement therewith; whereby motion of said adjustable slide normal to said shaft will influence motion of said shaft and said first bevel gear in the direction of the axis thereof to adjust the mesh with said associated bevel gear.

2. An electrically driven power tool as set forth in claim 1 in which said section slotted at an angle to the axis of said shaft includes a slot base extending substantially diametrically across said shaft, and slot edges substantially perpendicular to said slot base arranged at said acute angle to the axis of said shaft, in which means are provided for retaining said adjustable slide on said frame with said edge formed as a ramp arranged in selected position of engagement of with one of said slot edges to adjust the mesh between said associated bevel gears, and with said adjustable slide also in engagement with said slot base to inhibit rotation of said shaft.

* * * * *